March 31, 1959   W. W. WOLFORD   2,879,883
CONTAINER HANDLING APPARATUS
Filed Dec. 2, 1957   2 Sheets-Sheet 1
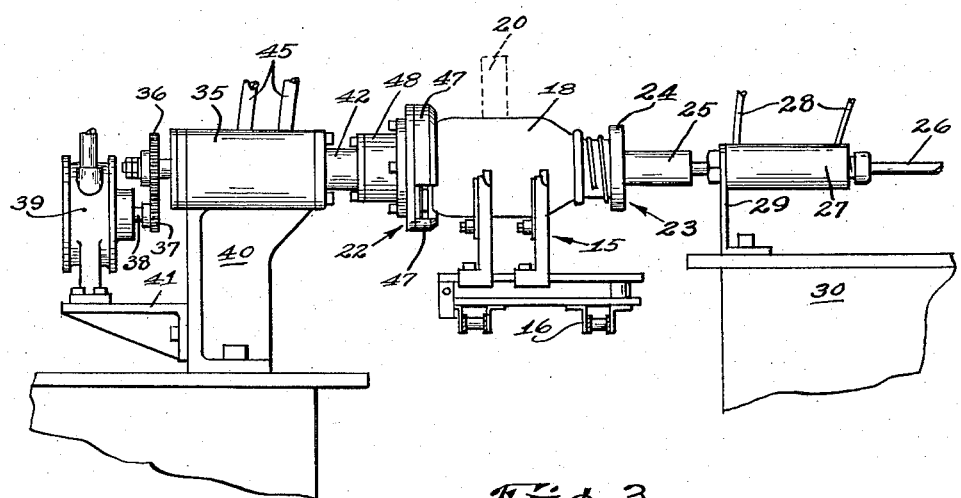
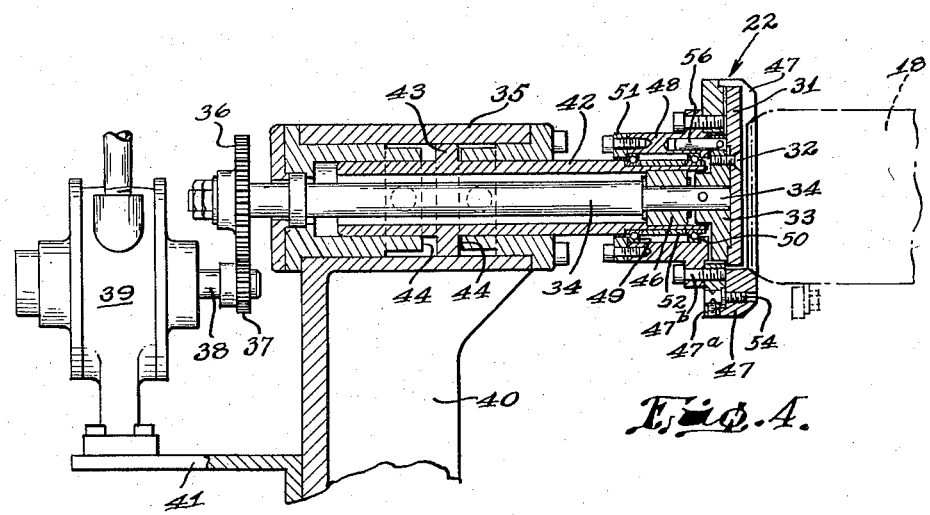
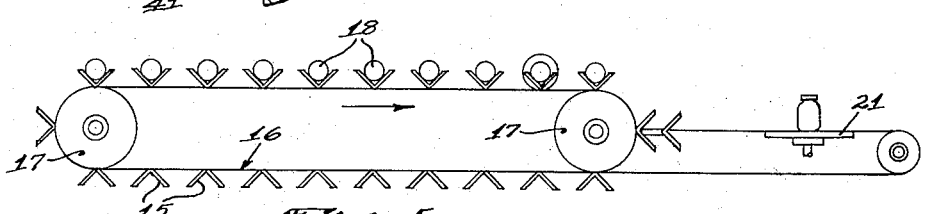
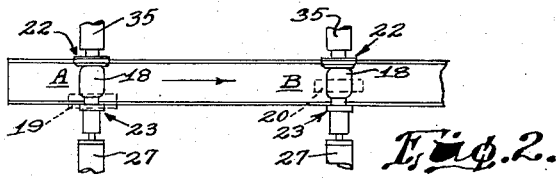
INVENTOR
WALLACE W. WOLFORD
BY
ATTORNEYS March 31, 1959 W. W. WOLFORD 2,879,883
CONTAINER HANDLING APPARATUS
Filed Dec. 2, 1957 2 Sheets-Sheet 2

INVENTOR
WALLACE W. WOLFORD
BY
Rule & Hoge
ATTORNEYS

United States Patent Office 2,879,883
Patented Mar. 31, 1959

2,879,883

CONTAINER HANDLING APPARATUS

Wallace W. Wolford, Oakland, Calif., assignor to Owens-Illinois Glass Company, a corporation of Ohio Application December 2, 1957, Serial No. 700,159

6 Claims. (Cl. 198—33)

My invention relates to container handling apparatus and particularly is concerned with the provision of novel, simple means for manipulating articles of glassware, such as bottles and jars, at an inspecting station where they are rotated about their axes in the presence of devices which function to detect predetermined specific kinds of imperfections.

In the production of glass bottles and jars, it is important to rather closely control the dimensions and contour and especially to avoid to the extent practicable the creation of "out-of-round" necks and "sunken" side walls. Despite efforts in these directions some ware produced is defective and must be detected and discarded. Apparatus for inspecting bottles and jars may consist of a series of cradles which bring the articles to stations where inspecting devices operate to detect imperfections of predetermined character and degree. In detecting and discarding ware having the above described imperfections the articles must be removed from the cradles and rotated about their axes with the surfaces to be checked, in contact with the inspecting device.

An object of my invention is the provision of novel means for elevating bottles or jars above their supporting cradles and positioning them for rotation while in contact with inspecting devices.

Other objects will be in part apparent and in part pointed out hereinafter.

In the drawings:

Fig. 1 is a side elevational view more or less diagrammatically showing a cradle-type handling mechanism for carrying bottles or jars to inspecting stations.

Fig. 2 is a fragmentary plan view showing cradle supported articles at inspecting stations.

Fig. 3 is an elevational view with the cradle chain in cross section showing the present invention rotatably supporting a jar immediately above a cradle at an inspecting station.

Fig. 4 is a fragmentary detail sectional view, partially in elevation, showing the base chuck and operating means therefor.

Figure 7:
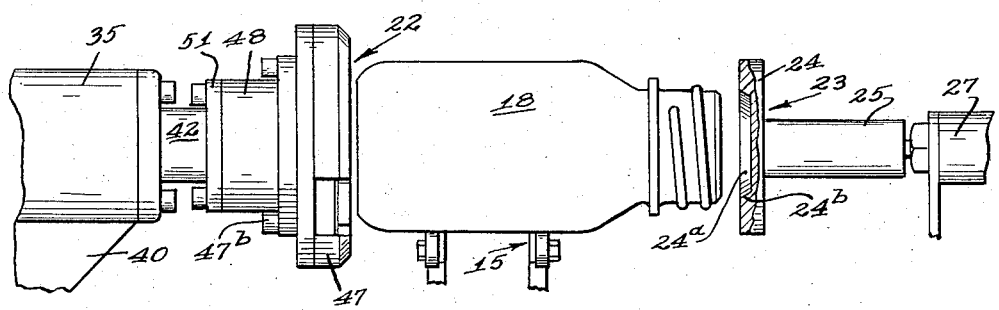
Fig. 7 is an elevational view, partly in section, showing the initial relative positions of a cradle supported jar and the chucks at an inspecting station.

In the illustrated embodiment of my invention it is shown in conjunction with conveying and inspecting apparatus (Figs. 1 and 2) comprising an endless series of cradles 15 supported upon a chain-type carrier 16 which is trained over pulleys 17, one of these pulleys being positively rotated intermittently by means (not shown) whereby to bring the cradles one at a time to inspecting stations A and B. These cradles support bottles or jars 18 in recumbent positions and in such fashion that they may be raised out of contact with the cradles and rotated about their horizontal axes in the presence of inspecting devices 19 and 20 which check the articles for "out-of-round" necks and "sunken" sides, respectively. The articles are then returned to their cradles and later removed therefrom and placed upon an accumulator packing table 21 by transfer means (not shown).

With arrival of a bottle or jar supporting cradle 15 at one of the inspecting stations A and B the advancing movement of all cradles is halted momentarily with the axis of one bottle substantially directly below and parallel with the common horizontal axis of base and neck chucks 22 and 23, respectively, which comprise elements of article elevating and rotating apparatus. Such apparatus is duplicated at stations A and B.

Figure 8:
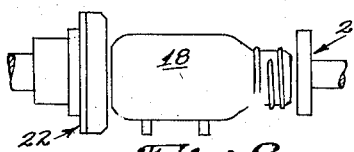
Figs. 8, 9 and 10 are views diagrammatically showing the successive positions occupied by a jar from the time of its arrival at an inspecting station to the time it is being rotated about its axis in a position above its cradle.
Figure 9:
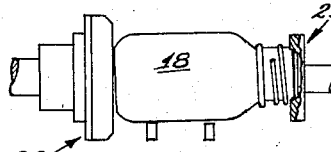

This apparatus operates in such fashion that the neck chuck 23 moves axially toward the open or neck end of the jar and elevates this end slightly and simultaneously moves the jar axially a short distance from the position of Fig. 8 to that of Fig. 9. Here the jar base in part contacts the base chuck 22 and the axis of the jar is inclined to the horizontal slightly. Thereupon an element of the base chuck is projected axially inward to elevate the base end of the jar sufficiently to bring the entire jar axis into alignment with the common axis of the chucks. In this position, the chucks positively rotate the jar about its axis and one or the other of inspecting devices 19 and 20 while riding in contact with a selected area of the jar determines whether it should be rejected or permitted to move on to the packing table 21. With reference to the specific elements comprising the jar elevating and rotating apparatus, the neck chuck 23 (Figs. 3 and 7) may well consist of a flat disk 24 supported on a holder 25 which is secured to one end of a piston rod 26. This piston rod extends axially through an air cylinder 27 and carries a piston (not shown) which is reciprocated by air under pressure introduced through supply pipes 28 into the cylinder at opposite sides of the piston in alternation. The cylinder 27 may well be supported upon a bracket 29 carried by a frame member 30. The disk 24 is recessed on that side facing the base chuck, such recess 24ª being circular in form and provided with an annular side wall 24ᵇ of frusto-conical form. The dimensions of this recess and the angular position of the wall 24ᵇ are such that incident to initial inward axial movement of the disk this wall has a camming action upon the neck end of the jar and lifts it substantially to the position shown in Fig. 9.

Figure 5:
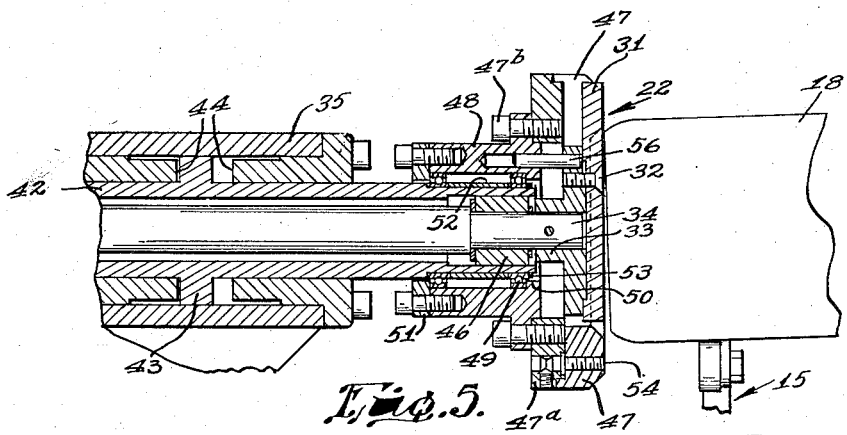
Fig. 5 is an enlarged detail sectional view of the base chuck.
Figures 5A, 6:
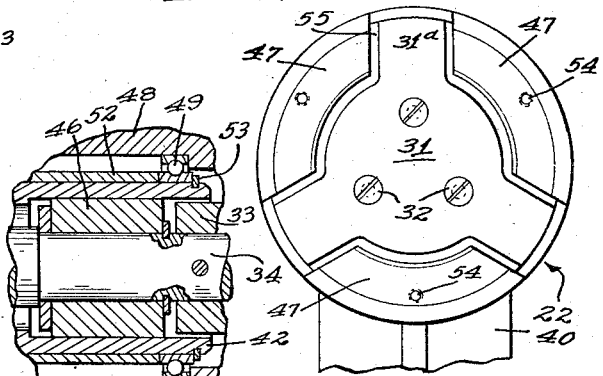
Fig. 5A is a detail sectional view showing particularly the mounting of the forward end of the tubular piston rod and its connection to the chuck jaws.
Fig. 6 is an inner end elevational view of the base chuck.
Figure 10:
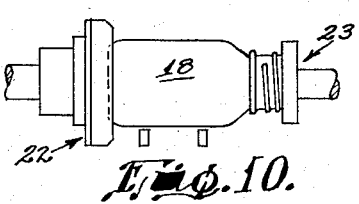

The base chuck 22 essentially is composed of a rotatable center contact plate or disk 31 secured by screws 32 to a flanged hub 33 which in turn is pinned to an end of a rotatable shaft 34. This shaft extends axially through a horizontal air cylinder 35 and carries a gear 36 which meshes with a driving pinion 37 mounted upon the motor shaft 38. An air motor 39 drives this shaft 38 continuously. A frame member 40 supports the air cylinder and a bracket 41 on said frame member supports the air motor 39. A tubular piston rod 42 carrying a piston 43 is mounted within the air cylinder 35, such rod being telescoped over the drive shaft 34 and spaced radially outward therefrom. Abutments 44 limit the extent of possible reciprocation of the piston 43. Air under pressure is supplied to the cylinder at opposite sides of the piston through supply pipes 45. The forward or inner end of this tubular piston rod 42 is telescoped over a collar 46 which functions in part as a bearing for the adjacent end of the shaft 34. Jar centering jaws 47 (Figs. 5, 6 and 7) encircle the center contact plate 31 and are carried by a supporting plate 47ª secured by screws 47ᵇ to a flanged hub 48 which is telescoped over the forward end of the tubular piston rod 42. The hub 48 is of somewhat larger diameter internally than the external diameter of the rod 42 and in the space provided therebetween ball bearings 49 are arranged. An abutment 50 at the flanged end of the hub 48 and a collar or ring 51 at the other end confine the ball bearings 49. A spacer 52 holds the bearings in the desired axial relationship and a retaining ring 53 near the adjacent end of the tubular piston rod 42 secures the spacer and ball bearings against bodily axial movement relative to said piston rod. Thus with reciprocation of the piston rod the flanged hub 48, ball bearings 49, spacer 52 and the centering jaws 47 move correspondingly.

The jaws 47 (Fig. 6) are of arcuate form being three in number in the illustrated embodiment. These jaws are separably connected by screws 54 to the aforementioned supporting plate 47ª. Adjacent ends of the jaws are spaced apart circumferentially to provide channels 55 designed to accommodate radial arms 31ª on the center contact plate 31. These arms lie in the same plane as the plate proper and as a consequence can accommodate bottles or jars of a variety of body and base diameters. Thus with a change involving only a difference in base diameter of the containers it is necessary only to change the jaws 47 and such is effected by merely loosening the screws 54 sufficiently to permit removal of the several jaws. A guide or positioning pin 56 aids in holding the jaws 47 and contact plate 31 in proper relationship at all times.

Briefly reviewed the operation comprises stopping a jar carrying cradle at an inspecting station and quickly moving the neck chuck axially inward thereby causing positioning of the jar about as indicated in Fig. 9 Immediately thereafter the centering jaws 31 of the base chuck are moved axially toward the jar to thereby elevate and center the base end of said jar with the result that the chucks and jar are in axial alignment. The chucks and jar rotate in unison while the inspecting device 19 or 20 operates to detect the presence of any imperfections of the types referred to above.

Modifications may be resorted to within the spirit and scope of the appended claims.

I claim:

1. For use with an endless series of cradles which move intermittently along a horizontal path to thereby bring generally cylindrical articles while supported in recumbent position thereon in succession to an inspecting station where they are to be lifted bodily away from the cradles and then rotated about their axes; a rotary base chuck positioned to one side of said path at the inspecting station with its axis disposed horizontally, a rotary neck chuck positioned at the other side of said path coaxially with the base chuck, the axis of said chucks being in a plane slightly above and parallel to that of an article when resting normally in a cradle, each chuck having a generally frusto-conical recess to accommodate an end of an article, means individual to the chucks for moving them axially one at a time into engagement with an end of an article whereby to elevate and support the article in spaced apart relation to its cradle and means for positively rotating one of the chucks.

2. For use with an endless series of cradles which move intermittently along a horizontal path to thereby bring generally cylindrical articles while supported in recumbent position thereon in succession to an inspecting station where they are to be lifted bodily away from the cradles and then rotated about their axes; a driven rotary base chuck positioned at one side of the path of travel of the cradles with its axis disposed horizontally, a freely rotatable neck chuck at the other side of the path of travel of said cradles disposed coaxially with the base chuck, the axis of said chucks being disposed in a plane slightly above and parallel to that through which the axes of articles move when supported normally on the cradles, each chuck having a generally frusto-conical recess to accommodate an end of an article, means for moving the neck chuck axially to engage and elevate an end of the article and move the article axially into contact with the base chuck, and means for then moving at least a portion of the base chuck axially toward the neck chuck to thereby elevate the adjacent end of the article and effect axial alignment of the article and both chucks.

3. Apparatus as defined in claim 2, the base chuck comprising a continuously rotating disk-like contact plate for initially engaging an end of the article and an annular series of article centering jaws encircling said plate and movable axially into and out of engagement with the article by the aforementioned base chuck moving means to effect axial alignment of the article and chucks.

4. Apparatus as defined in claim 2, the base chuck comprising a continuously rotating disk-like contact plate for initially engaging an end of the article, an annular series of article centering jaws encircling said plate, means for rotating the contact plate and jaws as a unit and means for moving the jaws axially relative to the contact plate.

5. Apparatus as defined in claim 4, said jaw moving means comprising an air cylinder, a piston carrying sleeve mounted in and projecting outwardly of one end of the cylinder and means separably connecting the jaws to the sleeve.

6. Apparatus as defined in claim 4, said contact plate and jaws rotating means comprising a continuously rotating shaft coaxial with said chucks, means securing the contact plate to one end of said shaft and a plurality of radial fingers on the contact plate positioned between and engageable with adjacent ends of the series of centering jaws to impart rotary motion to the latter.

References Cited in the file of this patent

UNITED STATES PATENTS 2,734,619   Labombarde _____ Feb. 14, 1956